(No Model.) 2 Sheets—Sheet 1.
J. M. SKIPPER.
KITCHEN CABINET.
No. 406,543. Patented July 9, 1889.
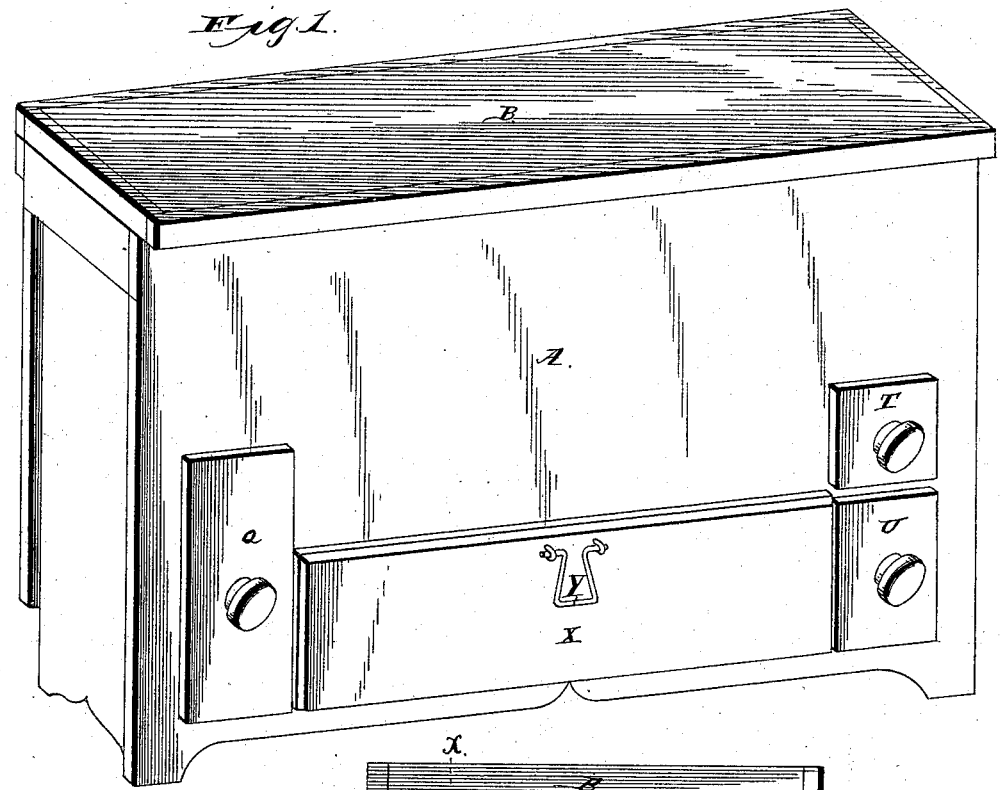
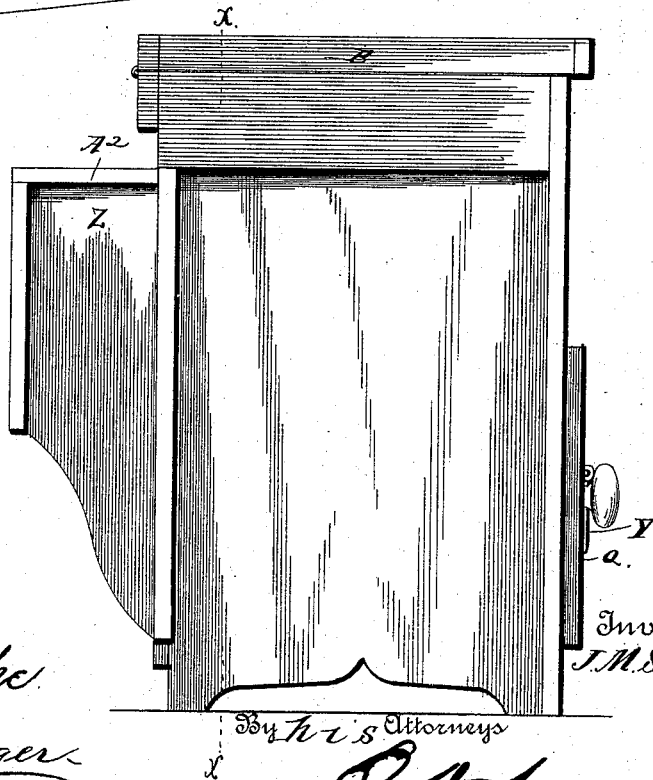
Witnesses
Geo. G. Thorpe
Wm. Bagger
Inventor
J. M. Skipper
By his Attorneys (No Model.) 2 Sheets—Sheet 2.
J. M. SKIPPER.
KITCHEN CABINET.
No. 406,543. Patented July 9, 1889.
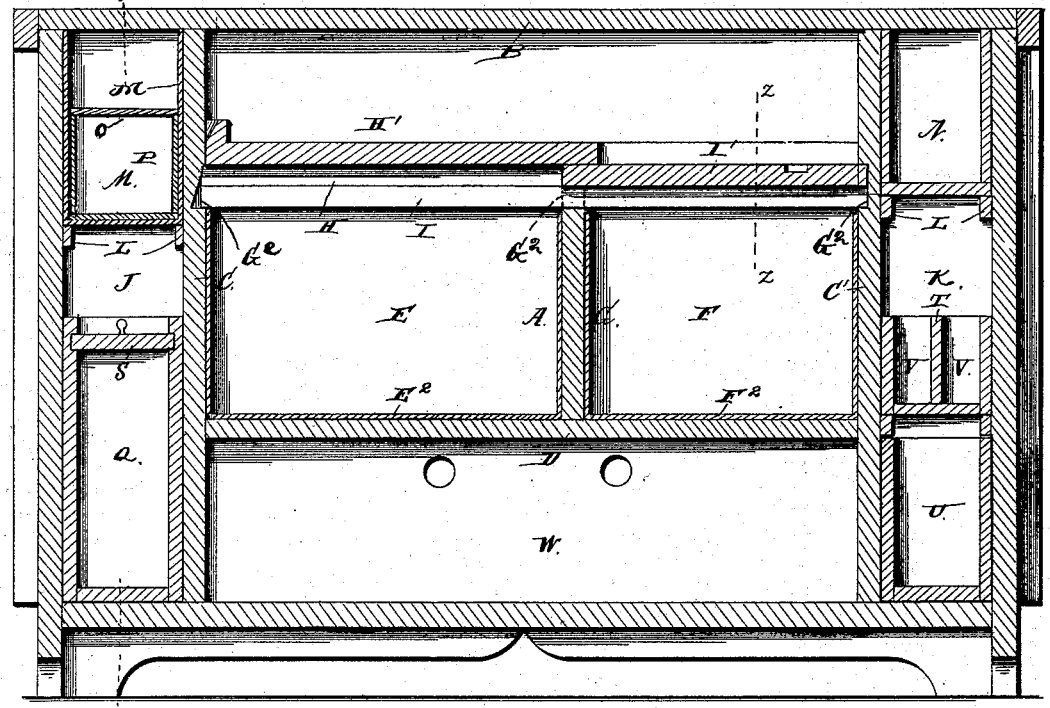
Witnesses
Geo. Y. Thorpe
Wm. Bagger
Inventor
J. M. Skipper
By his Attorneys

UNITED STATES PATENT OFFICE.

JAMES MARION SKIPPER, OF GRANBURY, TEXAS.

KITCHEN-CABINET.

SPECIFICATION forming part of Letters Patent No. 406,543, dated July 9, 1889.

Application filed February 12, 1889. Serial No. 299,563. (No model.)

*To all whom it may concern:*

Be it known that I, JAMES MARION SKIPPER, a citizen of the United States, residing at Granbury, in the county of Hood and State of Texas, have invented a new and useful Improvement in Kitchen-Cabinets, of which the following is a specification.

This invention relates to kitchen-cabinets; and it has for its object to provide a device of this class which shall be simple in construction, inexpensive, and in which provision shall be made for the safe-keeping of all the materials and ingredients used in bread-making and in ordinary cooking, as well as for pies, cakes, cold victuals, and the like.

The invention consists in the improved construction of the said cabinet, and in the arrangement of the details thereof, which will be hereinafter fully described, and particularly pointed out in the claim.

In the drawings, Figure 1 is a perspective view of my improved kitchen-cabinet. Fig. 2 is an end view of the same. Fig. 3 is a vertical sectional view taken on the line $x$ $x$ of Fig. 2. Fig. 4 is a transverse vertical sectional view on line $y$ $y$ of Fig. 3. Fig. 5 is a perspective detail view of one of the removable cases. Fig. 6 is a detail sectional view taken on the line $z$ $z$ in Fig. 3.

The same letters refer to the same parts in all the figures.

A designates a rectangular box of suitable dimensions, which constitutes the casing of my improved kitchen-cabinet, and which is provided with the lid or cover B, hinged to the upper rear edge thereof. The casing A is provided with two vertical partitions C C', arranged near the ends thereof, and connected near their lower ends by a horizontal partition D, which forms the bottom of the flour and meal bins E and F, which are separated by a vertical partition G, terminating at some distance from the top of the casing A. At the upper edge of the flour and meal bins and secured upon the front and rear sides of the casing A, forming the walls of the said bins, are arranged a pair of cleats or steps H I, supporting respectively the covers H' I' of the meal and flour bins, which said covers slide upon their respective cleats, one above the other, as will be clearly seen in Fig. 3 of the drawings. The cover H' of the flour-bin also serves as a kneading-board.

The compartments J and K, formed at the ends of the case by the partition-walls C C', are provided with horizontal cleats L, supporting the removable boxes or trays M N. The former of these is preferably made of sheet metal, and it has a horizontal shelf or half-way partition O, under which is arranged the spice-drawer P, the box formed by the partition O being used for the reception of biscuit and cake cutters and other like utensils. The space in the tray M in front of the spice-drawers is convenient for the reception of a lard-bucket. In the box N bags of soda and other similar ingredients may be placed.

In the bottom of the compartment J is arranged a sugar-drawer Q, having a vertical partition R and a slide-cover S, so that it may hold two grades of sugar. The bottom of the compartment K has supporting-cleats for two drawers T U, the former of which is constructed with several small compartments V, in which bottles of flavoring-extracts may be placed.

W is a compartment formed in the bottom of the casing or cabinet by the bottom and rear wall of the latter and the partitions C, C', and D. This compartment is provided with a door X, hinged to its lower front edge so as to open outwardly, said door being provided with a handle Y, which, when the door swings open, will swing outwardly from the same and rest upon the floor, thus supporting the door and forming a shelf, upon which articles may be placed temporarily before placing them in the compartment W. The latter is intended for the reception of cold victuals of all kinds, bread, cake, and the like.

To the back of the casing or cabinet is attached a supplemental casing Z, having a cover $A^2$, which said casing or compartment will be found convenient for the reception of paper bags containing groceries of all kinds.

The flour and meal bins E and F are to be provided with linings $E^2$ $F^2$, of zinc or other suitable sheet metal, which may be readily removed for the purpose of cleaning the same. When placed in their respective compartments, these linings are retained by the cleats H I, which in turn are supported in recesses $G^2$ in the partitions C, C', and G, thus enabling them to be readily removed when it is desired to remove the sheet-metal linings of the flour and meal bins.

The operation and advantages of this invention will be readily understood. The construction is simple and inexpensive, and it provides for the reception and safe-keeping of most of the principal ingredients and materials used in bread-making and ordinary cookery. The top of the casing or cabinet forms a convenient table, thus dispensing with a separate table as an article of kitchen-furniture, and as an article of furniture my improved cabinet is neat and ornamental.

It is obvious that any or all of the compartments of my improved kitchen-cabinet may be provided with locks of any suitable construction.

Having thus described my invention, I claim—

In a kitchen-cabinet, the casing A, having hinged lid B and partitions C C' D G, forming flour and meal bins E F, in combination with the removable sheet-metal linings for the said bins, the removable cleats H I, and the covers H' I', arranged to slide upon the said cleats one above the other, substantially as set forth.

In testimony that I claim the foregoing as my own I have hereto affixed my signature in presence of two witnesses.

JAMES MARION SKIPPER.

Witnesses:
J. B. LEMASTER,
J. E. PATTON.